US011128191B2

(12) United States Patent (10) Patent No.: US 11,128,191 B2
Chuang et al. (45) Date of Patent: Sep. 21, 2021

(54) WIRE BONDING DEVICE OF STATOR OF MOTOR

(71) Applicant: Chicony Power Technology Co., Ltd., New Taipei (TW)

(72) Inventors: Chia-Chi Chuang, New Taipei (TW); Hung-Jui Chang, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 205 days.

(21) Appl. No.: 16/693,351

(22) Filed: Nov. 24, 2019

(65) Prior Publication Data

US 2021/0111603 A1 Apr. 15, 2021

(30) Foreign Application Priority Data

Oct. 14, 2019 (TW) .................................. 10813691

(51) Int. Cl.
*H02K 3/28* (2006.01)
*H02K 1/16* (2006.01)
*H02K 3/38* (2006.01)
*H02K 3/50* (2006.01)

(52) U.S. Cl.
CPC ............... *H02K 3/28* (2013.01); *H02K 1/16* (2013.01); *H02K 3/38* (2013.01); *H02K 3/50* (2013.01)

(58) Field of Classification Search
CPC ........ H02K 3/28; H02K 2203/09; H02K 1/16; H02K 3/38; H02K 3/50
See application file for complete search history.

(56) References Cited

U.S. PATENT DOCUMENTS

| 8,878,407 | B2 | 11/2014 | Ikura et al. | |
|---|---|---|---|---|
| 8,922,079 | B2 * | 12/2014 | Egami | H02K 3/522 310/71 |
| 8,922,080 | B2 | 12/2014 | Nakagawa et al. | |
| 9,160,217 | B2 | 10/2015 | Nakagawa et al. | |
| 9,293,960 | B2 * | 3/2016 | Tomita | H02K 3/28 |
| 9,419,487 | B2 * | 8/2016 | Yazaki | H02K 3/522 |
| 10,069,351 | B2 * | 9/2018 | Kageme | H02K 21/22 |
| 10,097,069 | B2 * | 10/2018 | Egami | H02K 3/522 |

(Continued)

FOREIGN PATENT DOCUMENTS

| CN | 101079566 A | 11/2007 |
|---|---|---|
| CN | 102629726 A | 8/2012 |

(Continued)

*Primary Examiner* — Robert W Horn

(74) *Attorney, Agent, or Firm* — CKC & Partners Co., LLC

(57) ABSTRACT

A wire bonding device of a stator of a motor includes an insulating ring, a conductive wire, and a wire-bonding terminal. The insulating ring includes a bottom, an inner sidewall, and an outer sidewall. The inner sidewall is connected to an inner edge of the bottom. The outer sidewall is connected to an outer edge of the bottom. The conductive wire is accommodated in the insulating ring. The conductive wire is covered with an insulating cladding layer. The wire-bonding terminal includes a clamping portion, a protruding portion, and a wire-bonding segment. The clamping portion clamps the conductive wire. An end of the protruding portion is connected to the clamping portion. Another end of the protruding portion protrudes out of the insulating ring. An end of the wire-bonding segment is connected to said another end of the protruding portion.

12 Claims, 5 Drawing Sheets

(56) References Cited

U.S. PATENT DOCUMENTS

| | | | |
|---|---|---|---|
| 10,742,003 B2 * | 8/2020 | Takahashi | H02K 3/50 |
| 11,056,946 B2 * | 7/2021 | Takahashi | H02K 3/522 |
| 2010/0187924 A1 | 7/2010 | Yagai et al. | |
| 2015/0017845 A1 | 1/2015 | Tomita et al. | |
| 2015/0076944 A1 | 3/2015 | Shim et al. | |
| 2016/0013691 A1 | 1/2016 | Houzumi et al. | |
| 2017/0012484 A1 | 1/2017 | Jong | |
| 2021/0111603 A1 * | 4/2021 | Chuang | H02K 3/28 |

FOREIGN PATENT DOCUMENTS

| | | |
|---|---|---|
| CN | 102782995 A | 11/2012 |
| CN | 102782995 B | 11/2014 |
| CN | 104380578 A | 2/2015 |
| CN | 107134873 A | 9/2017 |
| CN | 103973018 B | 10/2017 |
| DE | 102014005147 A1 | 10/2015 |
| EP | 2879277 A2 | 6/2015 |
| JP | S62-105409 A | 5/1987 |
| JP | 2008-187875 A | 8/2008 |
| JP | 2009-261082 A | 11/2009 |
| JP | 2009-303290 A | 12/2009 |
| JP | 2010-41898 A | 2/2010 |
| JP | 2011-205875 A | 10/2011 |
| JP | 2012-200039 A | 10/2012 |
| JP | 2015-171245 A | 9/2015 |
| JP | 2017-085756 A | 5/2017 |
| JP | 2019-118251 A | 7/2019 |
| TW | 583812 B | 4/2004 |
| TW | M487574 U | 10/2014 |
| TW | 201826667 A | 7/2018 |
| TW | 201929386 A | 7/2019 |
| WO | 2018/104418 A1 | 6/2018 |

\* cited by examiner

WIRE BONDING DEVICE OF STATOR OF MOTOR

RELATED APPLICATIONS

This application claims priority to Taiwan Application Serial Number 108136912, filed Oct. 14, 2019, which is herein incorporated by reference.

BACKGROUND

Technical Field

The present disclosure relates to a wire bonding device of a stator of a motor.

Description of Related Art

In the generation that technologies increasingly advance, the electrical motor industry is one of the cores of the modern industries. A motor is an electrical device that converts electrical energy into kinetic energy, and the power and the stability of the motor progress with each passing day. To reduce the motor size and ease of assembly are very important issues of the industry.

However, the processes of wiring a present motor are complicated. Not only is the amount of the used copper wires hard to be reduced, but the convenience of operation is also influenced. Specifically, in the conventional arts, the wiring processes between the wiring coils and conductive coils are performed in manual way, which are more complex and time-consuming, so that the labor costs remain high.

SUMMARY

An aspect of the disclosure is to provide a wire bonding device of a stator of a motor which can effectively reduce artificial assembly errors and facilitate disassembly, assembly, and adjustment.

According to an embodiment of the disclosure, a wire bonding device of a stator of a motor includes an insulating ring, a conductive wire, and a wire-bonding terminal. The insulating ring includes a bottom, an inner sidewall, and an outer sidewall. The inner sidewall is connected to an inner edge of the bottom. The outer sidewall is connected to an outer edge of the bottom. The conductive wire is accommodated in the insulating ring. The conductive wire is covered with an insulating cladding layer. The wire-bonding terminal includes a clamping portion, a protruding portion, and a wire-bonding segment. The clamping portion clamps the conductive wire. An end of the protruding portion is connected to the clamping portion. Another end of the protruding portion protrudes out of the insulating ring. An end of the wire-bonding segment is connected to said another end of the protruding portion.

In an embodiment of the disclosure, the inner sidewall is formed with a blocking portion configured to fix the conductive wire.

In an embodiment of the disclosure, the outer sidewall is formed with a blocking portion configured to fix the conductive wire.

In an embodiment of the disclosure, the outer sidewall is formed with an accommodating notch configured to fix the wire-bonding terminal.

In an embodiment of the disclosure, the wire-bonding segment includes a wire-bonding portion and a rising portion. The wire-bonding portion has a first notch. An end of the rising portion is connected to the wire-bonding portion. Another end of the rising portion is connected to the protruding portion.

In an embodiment of the disclosure, the wire-bonding portion further includes a fixing portion. An end of the fixing portion is connected to the rising portion and has a second notch.

In an embodiment of the disclosure, entrances of the first notch and the second notch are oriented in different directions.

In an embodiment of the disclosure, the first notch and the second notch are extended and bended toward a surface of the rising portion.

In an embodiment of the disclosure, the wire-bonding portion further has a third notch. Heights of the first notch and the third notch relative to the rising portion are different.

In an embodiment of the disclosure, entrances of the first notch and the third notch are oriented in an identical direction.

In an embodiment of the disclosure, the first notch is extended and bended toward a surface of the rising portion. The third notch is extended and bended toward another surface of the rising portion.

According to an embodiment of the disclosure, a wire bonding device of a stator of a motor includes an insulating ring and a plurality of wire-bonding terminal sets. The insulating ring includes a bottom, an inner sidewall, and an outer sidewall. The inner sidewall is connected to an inner edge of the bottom. The outer sidewall is connected to an outer edge of the bottom. Each of the wire-bonding terminal sets includes an embedded segment, a plurality of clamping portions, a plurality of protruding portions, and a plurality of wire-bonding segments. The embedded segment is accommodated in the insulating ring and composed of a power line having an insulating cladding layer. The clamping portions clamp a conductive wire in the power line. The protruding portions are integrally extended from the clamping portions respectively and protrude out of the insulating ring. The wire-bonding segments are integrally extended from the protruding portions respectively and located outside the insulating ring.

Accordingly, the wire bonding device of a stator of a motor of the present disclosure adopts a structure of a power line clamped with a wire-bonding terminal to replace a conventional copper bar. Compared with the conventional technique of using a plastic material junction box and separating the copper bars by a sufficient distance for insulation purposes, the insulation among the power lines of the present disclosure is achieved by the insulating cladding layers of the power lines themselves, so that the material cost can be greatly reduced. Moreover, since the wire bonding device of the present disclosure requires only one set of plastic mold corresponding to the insulating ring and two sets of metal molds corresponding to the wire-bonding terminals, the expenditure on the mold equipment is also reduced greatly. In addition, by providing a notch at a side edge of the wire-bonding segment where the wire-bonding terminal is exposed outside the insulating ring, all the wire-bonding terminals can simultaneously contact the junction wires and be fixed by rotating the insulating ring, thereby achieving the purpose of rapidly completing the operation of fixing the junction wires.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
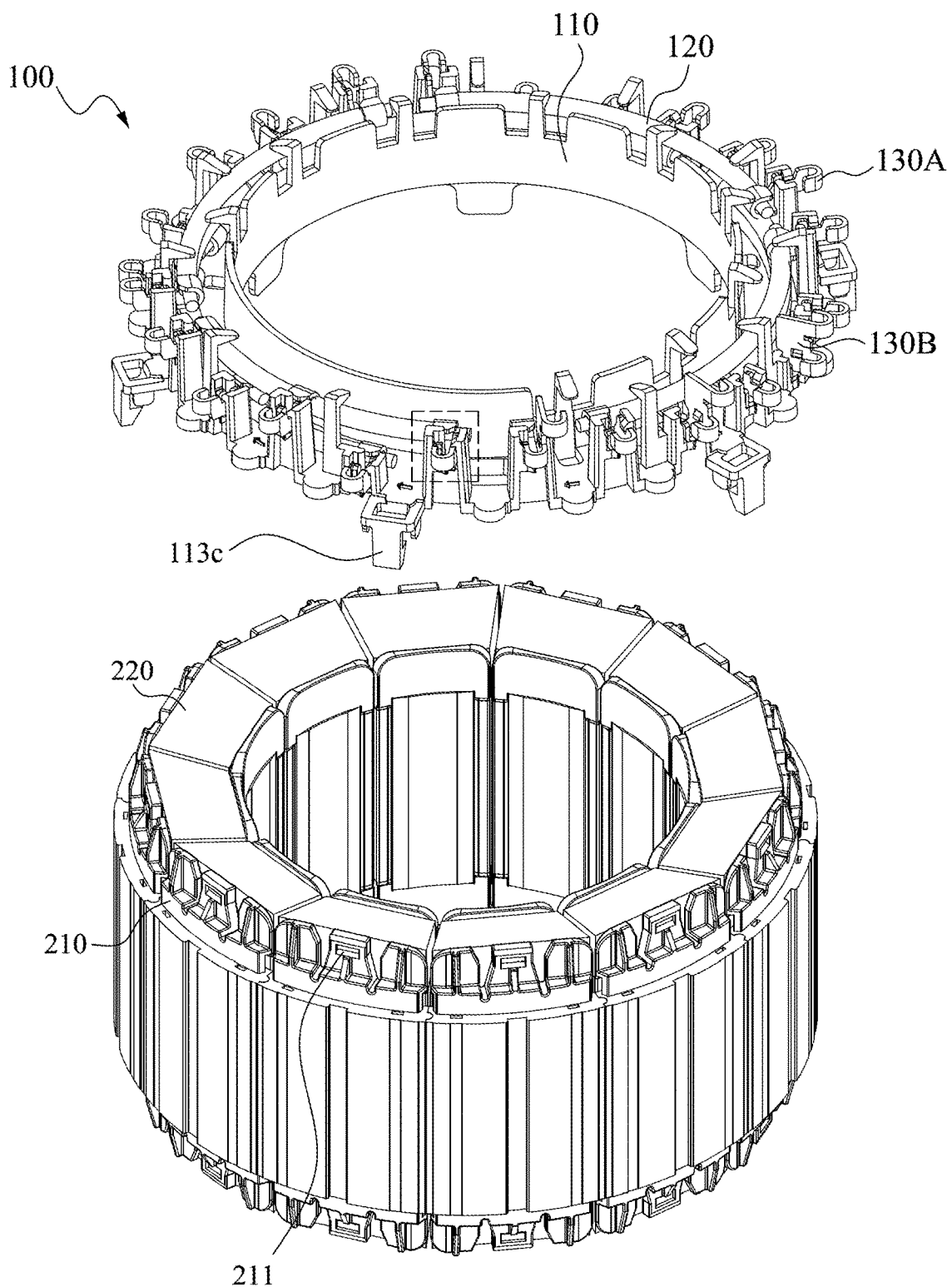
FIG. 1 is an exploded view of a wire bonding device of a stator of a motor and a bobbin according to an embodiment of the disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is an exploded view of a wire bonding device 100 of a stator of a motor and a bobbin 210 according to an embodiment of the disclosure. As shown in FIG. 1, in the present embodiment, the wire bonding device 100 is configured to be fixed to the bobbin 210. For example, in the present embodiment, the wire bonding device 100 includes a plurality of buckles 113c (only one of which is representatively labeled in FIG. 1), and the bobbin 210 has a plurality of slots 211 (only one of which is representatively labeled in FIG. 1). The buckles 113c are detachably engaged with the slots 211 respectively, so as to fix the wire bonding device 100 and the bobbin 210.

In some embodiments, at least one of the buckles 113c on the wire bonding device 100 can be exchanged with the corresponding slots 211 on the bobbin 210, and the purpose of fixing the wire bonding device 100 and the bobbin 210 can also be achieved. In practical applications, the wire bonding device 100 can also be fixed by junction wires (not shown) extended from the bobbin 210.

As shown in FIG. 1, in the present embodiment, the bobbin 210 is wound with a plurality of winding groups 220 (only one of which is representatively labeled in FIG. 1) of a stator of a motor. Specifically, in the present embodiment, a number of the winding groups 220 wound around the bobbin 210 is twelve, but the disclosure is not limited in this regard.

Figure 2:
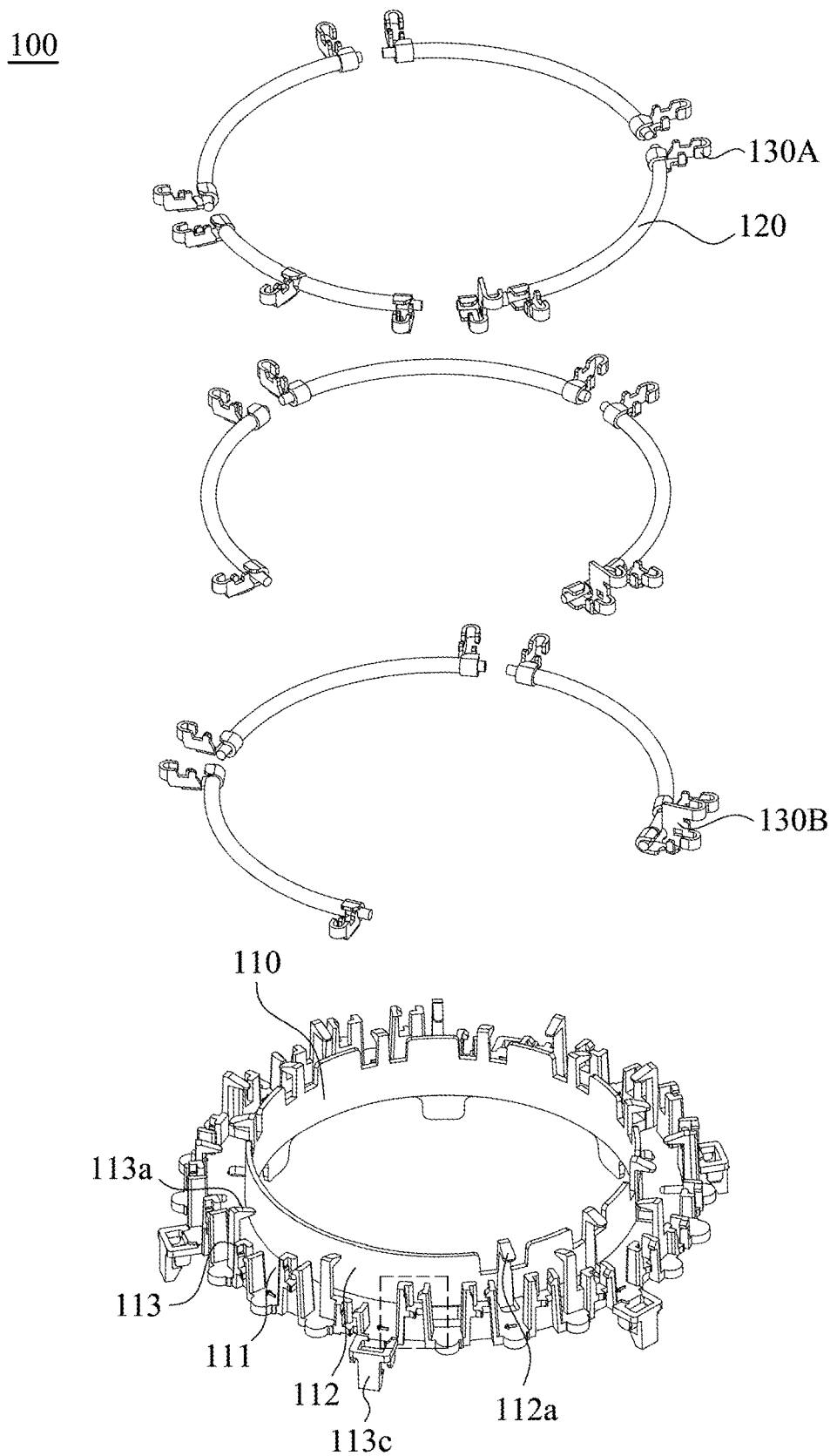
FIG. 2 is an exploded view of the wire bonding device shown in FIG. 1.
Figure 3:
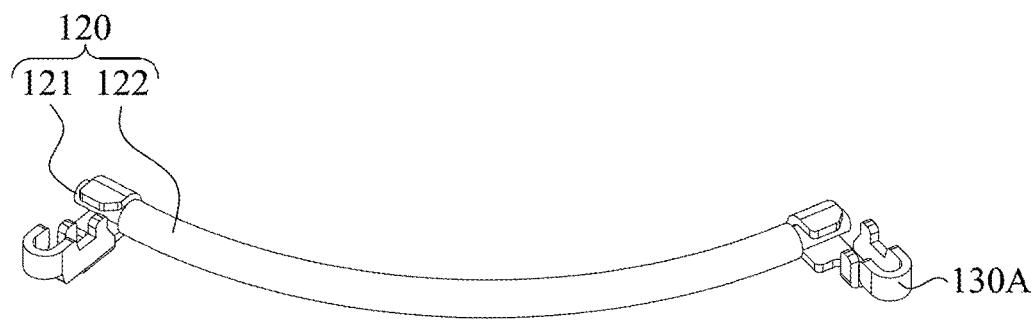
FIG. 3 is a perspective view of a pair of a power line and a wire-bonding terminal shown in FIG. 2.

Reference is made to FIGS. 2 and 3. FIG. 2 is an exploded view of the wire bonding device 100 shown in FIG. 1. FIG. 3 is a perspective view of a pair of a power line 120 and a wire-bonding terminal 130A shown in FIG. 2. As shown in FIGS. 1-3, in the present disclosure, the wire bonding device 100 includes an insulating ring 110, a plurality of power lines 120, and a plurality of wire-bonding terminals 130A. The insulating ring 110 includes a bottom 111, an inner sidewall 112, and an outer sidewall 113. The inner sidewall 112 is connected to an inner edge of the bottom 111. The outer sidewall 113 is connected to an outer edge of the bottom 111. The power lines 120 are accommodated in the insulating ring 110. The wire-bonding terminals 130A clamp the power lines 120, protrude out of the insulating ring 110, and are configured to be fixed to the junction wires (not shown) extended from the bobbin 210.

In the present embodiment, the inner sidewall 112 is formed with blocking portions 112a. The outer sidewall 113 is also formed with blocking portions 113a. The blocking portions 112a, 113a are extended over the bottom 111, so as to fix the power lines 120 and prevent the power lines 120 from detaching from the insulating ring 110. The blocking portions 112a of the inner sidewall 112 and the blocking portions 113a of the outer sidewall 113 are arranged in an interdigitated manner along a circular path.

In the present embodiment, the power lines 120 of the wire bonding device 100 can be up and down into four layers, and can be subdivided into three phases U, V, W and common point Y. The wire-bonding terminals 130A of the power lines 120 of the three phases U, V, W can be manufactured by the same metal mold, and a wire-bonding terminals 130B of the power lines 120 of the common point Y can be made of another metal mold.

In some embodiments, the power lines 120 of the wire bonding device 100 can also be arranged radially. That is, the power lines 120 are located at the same layer and are arranged side by side between the inner sidewall 112 and the outer sidewall 113 of the insulating ring 110.

In some embodiments, the materials of the insulating ring 110 include plastics and glass fibers to avoid electrical connections among the wire-bonding terminals 130A, 130B which cause short circuits. For example, the plastics includes polyethylene terephthalate, but the disclosure is not limited in this regard.

Figure 4:
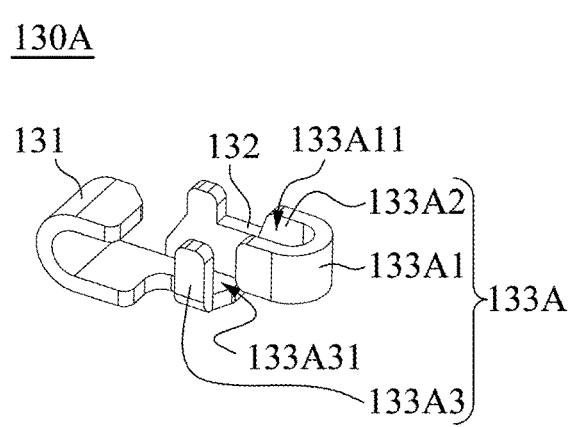
FIG. 4 is a perspective view of the wire-bonding terminal shown in FIG. 3.

Reference is made to FIG. 4. FIG. 4 is a perspective view of the wire-bonding terminal 130A shown in FIG. 3. As shown in FIGS. 2-4, in the present embodiment, the power line 120 includes a conductive wire 121 and an insulating cladding layer 122. The insulating cladding layer 122 wraps the conductive wire 121. The wire-bonding terminal 130A includes a clamping portion 131, a protruding portion 132, and a wire-bonding segment 133A. The clamping portion 131 clamps the conductive wire 121 of the power line 120. An end of the protruding portion 132 is integrally connected to the clamping portion 131. Another end of the protruding portion 132 protrudes out of the insulating ring 110. An end of the wire-bonding segment 133A is integrally connected to said another end of the protruding portion 132. From another point of view, the power line 120 and the wire-bonding terminal 130A connected thereto can be regarded as a wire-bonding terminal set, and the power line 120 can be regarded as an embedded segment of the wire-bonding terminal set accommodated in the insulating ring 110.

As shown in FIG. 4, in the present embodiment, the wire-bonding segment 133A of the wire-bonding terminal 130A includes a wire-bonding portion 133A1 and a rising portion 133A2. The wire-bonding portion 133A1 has a first notch 133A11. The first notch 133A11 is configured to be fixed to the junction wire extended from the bobbin 210. An end of the rising portion 133A2 is connected to the wire-bonding portion 133A1. Another end of the rising portion 133A2 is connected to the corresponding protruding portion 132. It is noted that the junction wire extended from below is an enameled wire (i.e., a metal material coated with one or more insulating paint films). When the junction wire is fixed, an excess part of the insulating paint films needs to be scraped off after the junction wire passes through the first notch 133A11, and then a welding process is performed.

With the design of the first notch 133A11, the wire-bonding terminal 130A can contact the corresponding junction wire and be fixed by rotating the insulating ring 110, thereby achieving the purpose of rapidly completing the operation of fixing the junction wires.

In some embodiments, the connection between the first notch 133A11 of the wire-bonding portion 133A1 and the junction wire extended from the bobbin 210 may be formed by, for example, soldering, arc welding, laser welding, ultrasonic welding, or resistance welding. With the design of the rising portion 133A2, the welding rod can be out of the way during welding, thereby facilitating automated production.

Also shown in FIG. 4, in the present embodiment, the foregoing wire-bonding segment 133A further includes a fixing portion 133A3. An end of the fixing portion 133A3 is connected to the rising portion 133A2 and has a second notch 133A31. Entrances of the first notch 133A11 and the second notch 133A31 are oriented in different directions. Specifically, as shown in FIG. 4, the entrance of the first notch 133A11 is oriented to the left, and the entrance of the second notch 133A31 is oriented upward. In some other embodiments, the outer sidewall 113 of the insulating ring 110 can be radially extended with a protruding structure (not shown) passing through the second notch 133A31 and pressing the fixing portion 133A3, so that the wire-bonding terminal 130A is not easily separated from the insulating ring 110.

In some embodiments, as shown in FIG. 4, the first notch 133A11 and the second notch 133A31 are extended and bended toward a surface of the rising portion 133A2 (i.e., the first notch 133A11 and the second notch 133A31 are located at the same side of the rising portion 133A2). By designing the first notch 133A11 and the second notch 133A31 to be bended in the same direction, the bending can be easily performed to facilitate the integral forming process.

Figure 5:
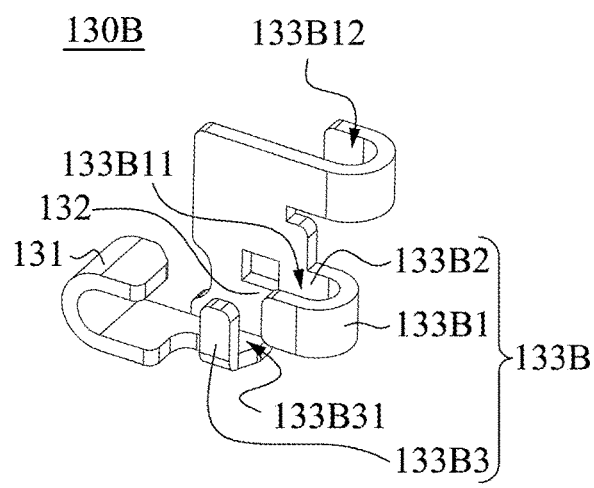
FIG. 5 is a perspective view of a wire-bonding terminal according to another embodiment of the disclosure.

Reference is made to FIG. 5. FIG. 5 is a perspective view of a wire-bonding terminal 130B according to another embodiment of the disclosure. As shown in FIG. 5, in the present embodiment, the wire-bonding segment 133B of the wire-bonding terminal 130B includes a wire-bonding portion 133B1, a rising portion 133B2, and a fixing portion 133B3. The wire-bonding portion 133B1 has a first notch 133B11. The first notch 133B11 is configured to be fixed to a junction wire extended from the bobbin 210. An end of the rising portion 133B2 is connected to the wire-bonding portion 133B1. Another end of the wire-bonding portion 133B1 is connected to a corresponding one of the protruding segments 133. An end of the fixing portion 133B3 is connected to the rising portion 133B2 and has a second notch 133B31. The shapes of the rising portion 133B2 and the fixing portion 133B3 included in the wire-bonding segment 133B and the relative position between the two are similar to those of the wire-bonding segment 133A shown in FIG. 4, so reference may be made to the above related description and would not repeated here for simplicity.

It should be pointed out that compared to the wire-bonding segment 133A shown in FIG. 4, the wire-bonding segment 133B shown in FIG. 5 further has a third notch 133B12. Heights of the first notch 133B11 and the third notch 133B12 relative to the rising portion 133B2 are different. Thereby, when welding the junction wire, the welding failure caused by the electrode head simultaneously clamping the first notch 133B11 and the third notch 133B12 at different heights can be prevented. Similarly, when the junction wire is fixed, an excess part of the insulating paint films needs to be scraped off after the junction wire passes through the third notch 133B12, and then a welding process is performed. It is noted that the junction wire fixed by the third notch 133B12 is a three phase power line.

In some embodiments, as shown in FIG. 5, entrances of the first notch 133B11 and the third notch 133B12 are oriented in an identical direction. Specifically, as shown in FIG. 5, the entrances of the first notch 133B11 and the third notch 133B12 are both oriented to the right. By designing the entrances of the first notch 133B11 and the third notch 133B12 to be oriented to the same direction, the insulating paint film of the junction wire extended from below can be cut off in the same rotating direction.

In some other embodiments, as shown in FIG. 5, the first notch 133B11 is extended and bended toward a surface of the rising portion 133B2. The third notch 133B12 is extended and bended toward another surface of the rising portion 133B2 (i.e., the first notch 133B11 and the third notch 133B12 are located at different sides of the rising portion 133B2). By designing the first notch 133B11 and the third notch 133B12 to be bended in opposite directions, the cutting operation of the insulating paint film can be facilitated.

In some embodiments, the surface of the wire-bonding terminals 130A, 130B may be partially insulated or not insulated.

Figure 6:
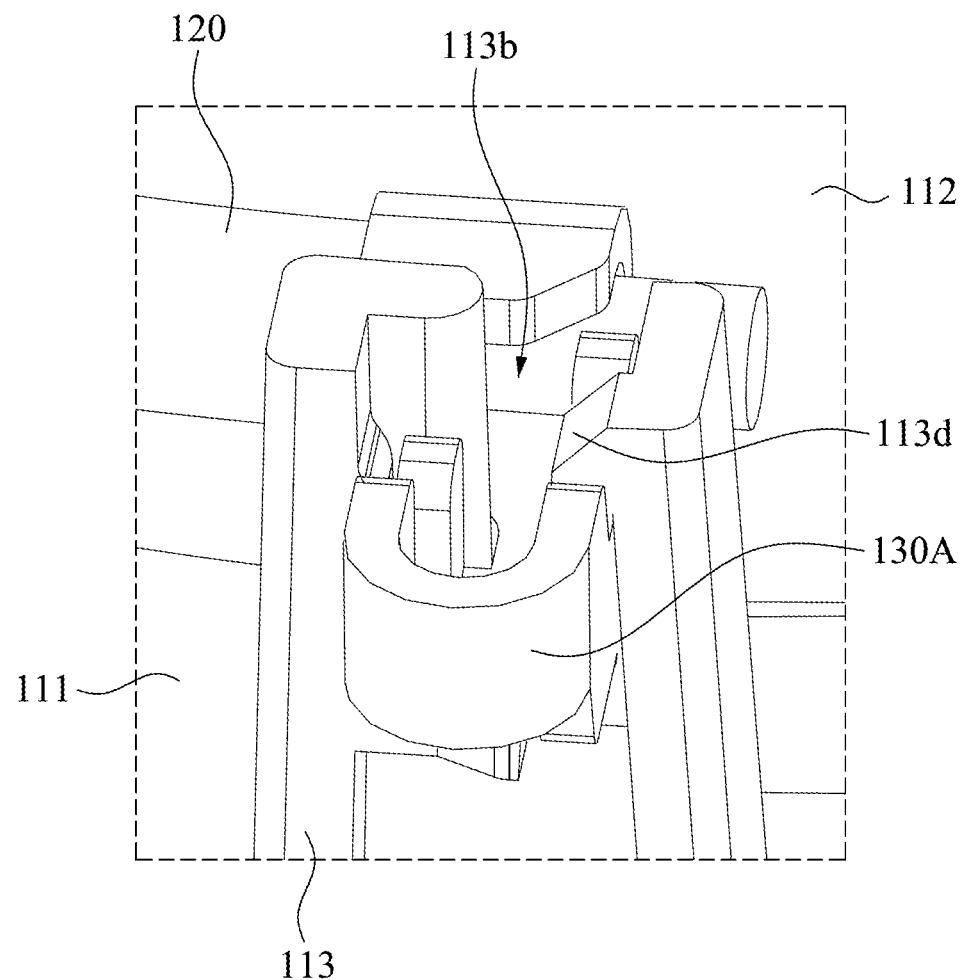
FIG. 6 is a partial enlarged view of FIG. 1.
Figure 7:
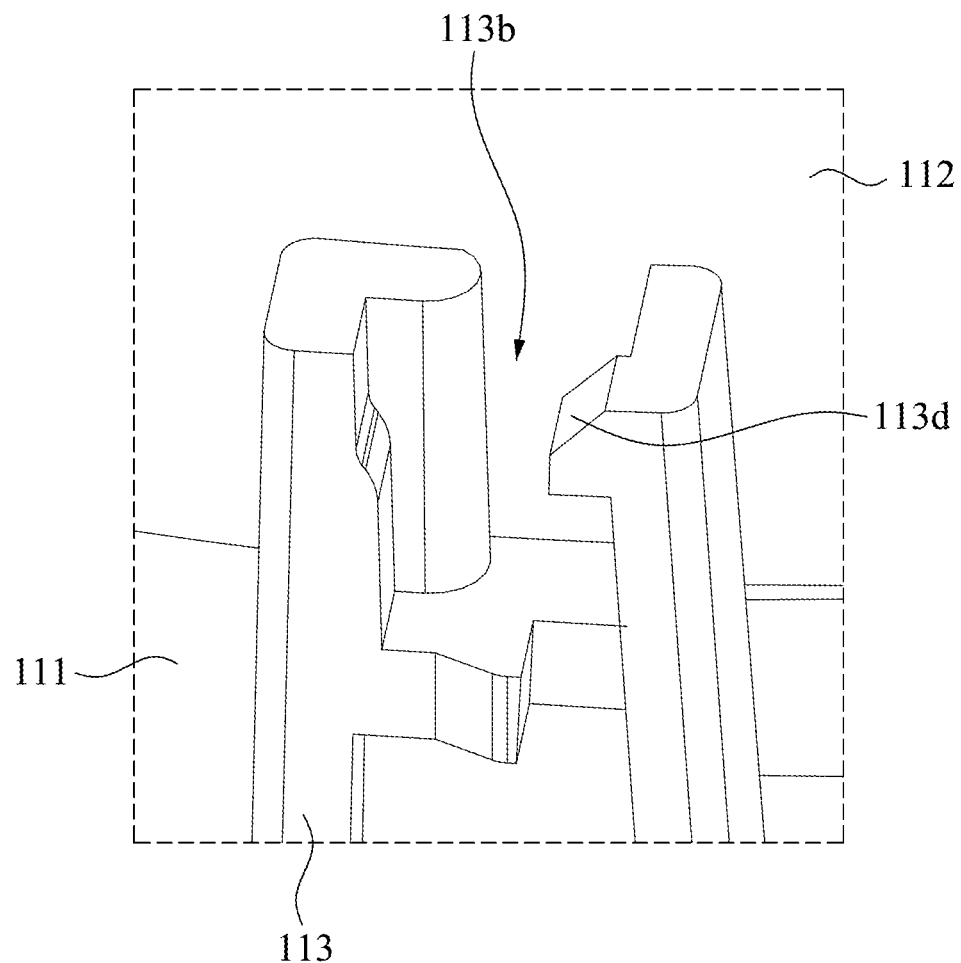
FIG. 7 is a partial enlarged view of FIG. 2.

Reference is made to FIGS. 6 and 7. FIG. 6 is a partial enlarged view of FIG. 1. FIG. 7 is a partial enlarged view of FIG. 2. As shown in FIGS. 6 and 7, in the present embodiment, the outer sidewall 113 of the insulating ring 110 is further formed with accommodating notches 113b. The accommodating notches 113b are configured to fix the wire-bonding terminals 130A, 130B. Thereby, the assembly procedure of the wire-bonding terminals 130A, 130B can be easily and conveniently performed by the assembler. Furthermore, the outer sidewall 113 if further formed with buckles 113d at entrances of the accommodating notches 113b. The buckles 113d are configured to be fastened on the wire-bonding terminals 130A, 130B when the wire-bonding terminals 130A, 130B are completely accommodated in the accommodating notches 113b, so as to fix the wire-bonding terminals 130A, 130B on the insulating ring 110 more firmly.

As shown in FIG. 1 with reference to FIG. 2, in the present embodiment, a total number of the first notches 133A11, 133B11 of the wire-bonding terminals 130A, 130B and the third notch 133B12 is twice the number of the winding groups 220. For example, in the present embodiment, the total number of the first notches 133A11, 133B11 of the wire-bonding terminals 130A, 130B and the third notch 133B12 may correspond the number of the winding groups 220 to be twenty four, but the disclosure is not limited in this regard.

According to the foregoing recitations of the embodiments of the disclosure, it can be seen that the wire bonding device of a stator of a motor of the present disclosure adopts a structure of a power line clamped with a wire-bonding terminal to replace a conventional copper bar. Compared with the conventional technique of using a plastic material junction box and separating the copper bars by a sufficient distance for insulation purposes, the insulation among the power lines of the present disclosure is achieved by the insulating cladding layers of the power lines themselves, so that the material cost can be greatly reduced. Moreover, since the wire bonding device of the present disclosure requires only one set of plastic mold corresponding to the insulating ring and two sets of metal molds corresponding to the wire-bonding terminals, the expenditure on the mold equipment is also reduced greatly. In addition, by providing a notch at a side edge of the wire-bonding segment where the wire-bonding terminal is exposed outside the insulating ring, all the wire-bonding terminals can simultaneously contact the junction wires and be fixed by rotating the insulating ring, thereby achieving the purpose of rapidly completing the operation of fixing the junction wires.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wire bonding device of a stator of a motor, the wire bonding device comprising:
    an insulating ring comprising:
        a bottom;
        an inner sidewall connected to an inner edge of the bottom; and
        an outer sidewall connected to an outer edge of the bottom;
    a conductive wire accommodated in the insulating ring, the conductive wire being covered with an insulating cladding layer; and
    a wire-bonding terminal comprising:
        a clamping portion clamping the conductive wire;
        a protruding portion, an end of the protruding portion being connected to the clamping portion, another end of the protruding portion protruding out of the insulating ring; and
        a wire-bonding segment, an end of the wire-bonding segment being connected to said another end of the protruding portion.

2. The wire bonding device of claim 1, wherein the inner sidewall is formed with a blocking portion configured to fix the conductive wire.

3. The wire bonding device of claim 1, wherein the outer sidewall is formed with a blocking portion configured to fix the conductive wire.

4. The wire bonding device of claim 1, wherein the outer sidewall is formed with an accommodating notch configured to fix the wire-bonding terminal.

5. The wire bonding device of claim 1, wherein the wire-bonding segment comprises:
    a wire-bonding portion having a first notch; and
    a rising portion, an end of the rising portion being connected to the wire-bonding portion, another end of the rising portion being connected to the protruding portion.

6. The wire bonding device of claim 5, wherein the wire-bonding portion further comprises a fixing portion, and an end of the fixing portion is connected to the rising portion and has a second notch.

7. The wire bonding device of claim 6, wherein entrances of the first notch and the second notch are oriented in different directions.

8. The wire bonding device of claim 6, wherein the first notch and the second notch are extended and bended toward a surface of the rising portion.

9. The wire bonding device of claim 6, wherein the wire-bonding portion further has a third notch, and heights of the first notch and the third notch relative to the rising portion are different.

10. The wire bonding device of claim 9, wherein entrances of the first notch and the third notch are oriented in an identical direction.

11. The wire bonding device of claim 9, wherein the first notch is extended and bended toward a surface of the rising portion, and the third notch is extended and bended toward another surface of the rising portion.

12. A wire bonding device of a stator of a motor, the wire bonding device comprising:
    an insulating ring comprising:
        a bottom;
        an inner sidewall connected to an inner edge of the bottom; and
        an outer sidewall connected to an outer edge of the bottom;
    and
    a plurality of wire-bonding terminal sets each comprising:
        an embedded segment accommodated in the insulating ring and composed of a power line having an insulating cladding layer;
        a plurality of clamping portions clamping a conductive wire in the power line;
        a plurality of protruding portions integrally extended from the clamping portions respectively and protruding out of the insulating ring;
    and
        a plurality of wire-bonding segments integrally extended from the protruding portions respectively and located outside the insulating ring.

* * * * *